United States Patent [19]

Player et al.

[11] Patent Number: 4,748,041

[45] Date of Patent: May 31, 1988

[54] SHELF STABLE NON-AQUEOUS SQUEEZABLE COMPOSITION

[75] Inventors: Kenneth W. Player, Olmsted Falls; Carey R. Mohnasky, Middleburg Heights, both of Ohio

[73] Assignee: Durkee Industrial Foods Corp., Cleveland, Ohio

[21] Appl. No.: 836,913

[22] Filed: Mar. 6, 1986

[51] Int. Cl.$^4$ ............................................. H23C 20/00
[52] U.S. Cl. ..................................... 426/601; 426/589; 426/632; 426/613; 426/582
[58] Field of Search ............... 426/601, 589, 632, 613, 426/582

[56] References Cited

U.S. PATENT DOCUMENTS

| | | | |
|---|---|---|---|
| Re. 30,722 | 8/1981 | Olds et al. | 426/101 X |
| 2,222,560 | 11/1940 | Clickner | 426/613 |
| 3,814,825 | 6/1974 | Gilmartin, Jr. et al. | 426/582 |
| 3,903,311 | 9/1975 | Billerbeck et al. | 426/611 X |
| 4,086,370 | 4/1978 | Olds et al. | 426/613 |
| 4,198,439 | 4/1980 | Hoover | 426/632 |
| 4,414,239 | 11/1983 | Oven | 426/306 X |
| 4,482,575 | 11/1984 | Olds | 426/613 X |

FOREIGN PATENT DOCUMENTS 2310704  12/1976  France ........................... 426/613

*Primary Examiner*—Jeanette Hunter
*Attorney, Agent, or Firm*—Richard H. Thomas

[57] ABSTRACT

An edible, lipid based squeezable, flavored savory shelf-stable composition designed to be shelf stored in a deformable plastic bottle, and to be squeezable at room temperature from a narrow opening of such bottle by the use of ordinary hand pressure, said composition having a paste consistency or stand-up similar to that of a cheese dip and containing lipid, emulsifier and bulking agent.

6 Claims, No Drawings

SHELF STABLE NON-AQUEOUS SQUEEZABLE COMPOSITION

The present invention relates to an edible, squeezable, flavored savory composition designed to be shelf stored in a deformable plastic bottle, and to be squeezable at room temperature from a narrow opening of such bottle by the use of ordinary hand pressure.

The product of the present invention may have a savory flavor such as fish, meat, fruit, fowl, or cheese, is adapted for consumption at room temperature, and is ordinarily applied to a farinaceous substrate, such as a cracker, chip or pretzel, for such consumption. When applied to a substrate, it has a paste consistency or stand-up similar to that of a cheese dip.

The product of the present invention is anhydrous, as contrasted with butter, preferably having a maximum moisture content of about 3½% by weight. It requires no refrigeration.

BACKGROUND OF THE PRESENT INVENTION

Prior U.S. Pat. No. RE 30722, granted Aug. 25, 1981, discloses a confection topping, normally in liquid form, which is adapted to be applied by a consumer to a frozen dessert such as ice cream, to form a hardened shell on the dessert. This topping is marketed under the trade name "Magic Shell", by Smucker's. It is designed to be shelf stored at room temperature in a plastic bottle and squeezed from the bottle by ordinary hand pressure.

The lipid portion of the topping comprises, for instance, in Example 1 of the patent, a blend of a hydrogenated vegetable oil having a Solid Fat Index of about 3-5% at 70° F., a refined coconut oil having a melt point of about 76° F. and a shortening containing about 6% stearine and 4% mono-diglyceride. The dry solids portion of the topping comprises powdered sugar, corn syrup solids, cocoa and non-fat dry milk. It is indicated in the patent that rapid hardening of the topping, when applied to a frozen dessert, is due to the seeding effect of the crystalized emulsifier and stearine present in the product. In other words, when the composition is chilled to a temperature below about 32° F., crystallization of the fat is seeded whereby the composition is converted almost instantly from a fluid to a brittle, solid state.

The present invention is distinguishable from this patent in that it is not adapted for application to a frozen dessert. By contrast, the product of the present invention is designed to have stand-up at room temperature, that is, a discernible thickness on a farinaceous substrate such as a cracker. At the same time, it is capable of being squeezed from a narrow opening at room temperature, as in Re 30722, and has the same storage stability, such as resistance to phase separation at room temperature.

In addition, the present invention is distinguishable from Re 30722 in that the latter is limited only to cocoa based flavors, whereas the present invention embraces savory flavors other than cocoa.

Copending application Ser. No. 612,976 relates to a shelf-stable, non-aqueous spreadable filling which can have a savory or cheese flavor. The filling is adapted to be extruded or co-extruded, at an elevated temperature, onto or with a farinaceous substrate to produce a filled product such as a confectionery center or a cracker creme. On cooling to room temperature, the filling has a plastic consistency similar to that of peanut butter.

The lipid portion of the composition of Ser. No. 612,976 comprises a hydrogenated vegetable oil having a Solids Fat Index at 70° F. of less than about 30, plus a lipid stabilizer having a Capillary Melting Point in the range of about 125°-150° F. Typical stabilizers are high-melting point mono-diglyceride and stearines. Another stabilizer useful in the spreadable filling of copending application Ser. No. 612,976 is triglycerol monostearate (a polyglycerol ester) having a Capillary Melting Point of about 127°-131° F. This emulsifier is lipophilic and has an HLB of about 7.2. The stabilizer is employed in an amount of about 3-6% by weight and functions on cooling to form a crystal matrix for the composition.

The fill portion of the composition of this patent can comprise a cheese powder; a dairy-derived food additive such as non-fat dry milk or non-fat buttermilk solids; a friable, bland protein such as defatted soy protein, caseinate, or textured vegetable protein; a bland, hydrolyzed non-hygroscopic friable starch such as a low DE corn syrup solid; and a disaccharide such as lactose or whey.

The disclosure of Ser. No. 612,976 is incorporated by reference herein.

The present invention is distinguishable from the disclosure of this copending application primarily in the lipid portion of the composition and in the characteristics of the end product.

DISCLOSURE OF INVENTION

The present invention resides in the discovery of a savory or cheese-flavored edible composition which is shelf-stable, lipid-based, anhydrous, and squeezable in the sense that it is suitable for hand dispensing at a temperature as low as 50° F. from a hand-deformable plastic container through an orifice of about two to about five millimeters (or larger) in diameter, the composition consisting essentially of, based on the composition weight (a) about 25% to about 70% lipid; and about 75% to about 30% fill; said lipid consisting essentially of a vegetable oil carrier, lecithin and lipophilic ester emulsifier having a Capillary Melting Point above about 125° F. and an HLB less than about 8, with the lecithin being about 0.3-0.6% of the lipid weight and the ester emulsifier being about 0.5% to about 2% of the lipid weight; said vegetable oil carrier being selected from the group consisting of (1) a vegetable oil blend comprising (a) about 30% to about 70% hydrogenated non-lauric vegetable oil having a Wiley Melting Point of about 50° F. to about 85° F., an AOM stability of at least about 75 hours, and an SFI Index at 50° F. of less than about 20; and (b) about 70% to about 30% of a lauric fat having a Wiley Melting Point less than about 96° F., said blend having an SFI Index at 50° F. of less than about 5; (2) the non-lauric vegetable oil of paragraph 1 (a) winterized at a temperature less than about 60° F. and emulsified; and (3) a medium chain triglyceride; said composition having a Brookfield viscosity of about 10 to about 60 at 120° F.

BEST MODE FOR CARRYING OUT THE INVENTION AND INDUSTRIAL APPLICABILITY

The Lipid Portion of the Composition

The lipid portion of the composition is primarily the vegetable oil carrier. The characteristics of the carrier are critical to achieve (a) AOM stability; that is, shelf storage stability at room temperature against oxidative degradation; (b) stability against phase separation while shelf stored at room temperature; (c) squeezability in a temperature range down to about 50° F. and up to 70° F. or higher; and (d) stand-up on a substrate following extrusion or removal from a container.

For purposes of the present application, the term "AOM stability" means stability for at least about 75 hours as determined by the Active Oxygen Method (which is the number of hours for an oil to obtain a peroxide value of 100 under standard conditions). With high AOM stability, the product of the present invention can be stored for prolonged periods of time under normal ambient conditions without refrigeration.

The term "squeezable" means the ability to be squeezed from a deformable plastic bottle through an opening as small as about two millimeters in diameter at a temperature as low as about 50° F., by ordinary hand pressure. The problem in a squeezable product, in addition to overall consistency or viscosity, is not the dry fill solids. These can be fine ground to whatever size is desired. Instead, the problem is in lipid crystals wherein the crystals can be present in an amount effective to plug a narrow opening or orifice.

The term "stand-up" means that the product has a visually ascertainable thickness when applied to a substrate, as contrasted with a film. Normally, the product of the present invention will have the consistency of a dip, in that it can be picked up from a container with a substrate as frangible as a chip. In this regard, although the product of the present invention is designed for extrusion from a deformable plastic bottle, and is so defined, it is within the scope of the present invention to market the product in other forms, for instance, in a container from which the product can be spooned, or collected, for instance, with a chip or pretzel.

The term "stability against phase separation" at room temperature, during storage, means that the product of the present invention will not show significant settling of fill solids or formation of an oil layer at the top during storage. A thin oil layer may form, similar to that which can form in stored peanut butter, but not one that cannot be readily dispersed by minimum working or mixing.

Very few vegetable oil carriers will function in the practice of the present invention. For instance, a corn oil or salad oil will not have the necessary AOM stability for prolonged storage at room temperatures. Generally, edible oils are classified as non-lauric or lauric. Lauric oils, for instance a 76° F. melting point coconut oil, have normally good oxidative stability, but are too plastic or stiff to be squeezable as defined above. Non-lauric oils, such as soybean oil, cottonseed oil or soybean/cottonseed blends, prior to hydrogenation, have low oxidative stability, but if hydrogenated to improved oxidative stability, are also too plastic or stiff, or have too high a Solids Index at 50°–70° F., to be squeezable.

One oil carrier found to work well in the present application is a eutectic blend of a partially hydrogenated non-lauric domestic oil with a low melting point lauric fat. The blend ratio can be in the range of about 70:30 to about 30:70. The hydrogenation of the non-lauric oil should be effective to provide an AOM stability of at least about 75 hours. Preferably, this will be to an IV of less than 100. Also, preferably, the hydrogenated non-lauric oil is either winterized or fractionated so that it has an SFI index at 70° F. of less than 10. Non-lauric oils which are hydrogenated are normally cottonseed, soybean, palm, and blends thereof.

One suitable non-lauric oil is a hydrogenated and fractionated soybean/cottonseed blend marketed by SCM Corporation under the trademark "Durkex 500". This oil has a Wiley Melting Point of about 73° F., an AOM stability of at least 350 hours, an IV of about 74–81, and a free fatty acid content of about 0.05 maximum.

The oil has a bland flavor, and is light in color, having a Lovibond color maximum of about 7.0 Red. Although it is not plastic in consistency, it does have a visual solids content, being cloudy in appearance. The SFI at 50° F. is about 20, decreasing to less than 10 at 70° F.

Another suitable low-melting point non-lauric oil is Durkex 100 (trademark SCM Corporation), a partially hydrogenated and winterized soybean oil having a Wiley Melting Point of about 65° F. and an SFI at 50° F. of about 11 maximum. Durkex 100 has an IV of about 85–90 maximum. It has an AOM stability of about 90 hours minimum, and a maximum Lovibond color of about 1.5 R. This product, as with Durkex 500, is bland in flavor.

The lauric oil portion of the blend can be coconut oil, with a Wiley Melting Point of 73°–79° F., (such as that marketed by SCM Corporation under the trademark Konut). This oil has a Lovibond color of 1.5 R (maximum) and an AOM value of 100 hours (minimum), and may have special usefulness in spreads suitable for warmer climates. This oil is normally plastic in consistency, e.g., at 70° F., with a Solids Index of about 15, by way of example. Konut has an IV of about 7–13.

Also useful as the lauric component in the carrier blend of the present invention is the "C" or "olefin" fraction of a fractionated palm kernel oil. This is largely a normally liquid lauric/myristic ($C_{12}$–$C_{14}$) triglyceride having an Iodine Value of about 26.6, a Mettler Drop Point of about 69.6° F., and an SFI at 70° F. of about zero, but at 50° F. of about 59. This composition is described in prior U.S. Pat. No. 4,410,557, to Miller, assigned to assignee of the present application, incorporated by reference herein.

Also useful is a partially hydrogenated coconut oil marketed by SCM Corporation under the trademark Hydrol 92. This compound has a Wiley Melting Point of about 96° F., an AOM stability of 100 hours maximum. Its SFI, at 70° F., is about 30 max., and at 50° F. about 60.

Although the proportions in the blend can vary, as indicated, from 70:30 to 30:70, the specific proportion used will depend upon the consistency of the end product desired, keeping the overall criteria in mind. By way of example, a very useful blend, using a combination of Durkex 500 and Konut, is 60% by weight Durkex 500 to 40% by weight Konut. With the use of a hydrogenated coconut oil such as Hydrol 92, this ratio should be increased to about 70% Durkex 500 to 30% Hydrol 92.

Essentially, the present invention is based on the discovery that the blend of a hydrogenated non-lauric oil and a lauric fat provides a relatively clear eutectic with a Solids Index at 50° F. of less than about 5%, even though separately each ingredient has a high Solids Index at 50° F., and that such eutectic blend is a surprisingly effective carrier in the practice of the present invention. The eutectic blend is not disclosed or suggested in copending application Ser. No. 612,976, and although the blend is broadly disclosed in U.S. Pat. No. Re 30722, it is not used therein for a squeezable savory product having room temperature stand-up.

Also useful as the lipid carrier portion of the composition of the present invention is an oil fraction tailored as a carrier for aluminum lakes. One such fraction is marketed by SCM Corporation under the trademark Durkex HSO. The compound is marketed as a vehicle carrier for flavor and fragrance ingredients, dyes/pigments, vitamins and medicinals. It is a winterized version of Durkex 500, i.e., a hydrogenated, fractionated soybean/cottonseed blend, with an added emulsifier pack so that it is liquid at 50° F. It has an Iodine Value of 80 and a viscosity at 50° C. of 45–47 cps. Winterization is carried out by holding the composition at a temperature less than about 60° F., e.g., about 57° F., for 6–8 hours, and then filtering the solids. The emulsifier pack is primarily Santone 8-5-O (octaglycerol pentaoleate, trademark SCM Corporation), so that the composition is virtually cloudless at 50° F. This compound would be used by itself as the carrier lipid.

Another suitable lipid carrier is a medium chain triglyceride. These are defined as the olein or "C" fraction of fractionated coconut oil enriched with medium chain $C_{12}-C_{14}$ triglycerides.

The emulsifier portion of the lipid part of the squeezable composition is a high melting point (solid) lipophilic ester, suitable to maintain dispersibility of the fill solids in the carrier; in combination with about 0.3–0.6% lecithin to reduce oil viscosity during mixing and facilitate dispersion. The lipophilic ester has a Wiley Melting Point above about 110° F. and an HLB less than about 8.

Preferred esters are polyglycerol esters of fatty acids and mono-diglycerides and their derivatives, e.g., lactylated mono-diglycerides and ethoxylated mono-diglycerides.

A suitable polyglycerol ester emulsifier is Santone 3-1-S (trademark, SCM Corporation), which is triglycerol monostearate (a polyglycerol ester) having a Capillary Melting Point in the range of about 127° F.–131° F. This emulsifier is lipophilic, having an HLB of about 7.2.

A suitable mono-diglyceride emulsifier is Dur-em 127 (trademark SCM Corporation). This compound has a monoglyceride content of about 40% minimum, an IV of 5 max., and a Capillary Melting Point of about 136°–143° F. The compound is marketed as a peanut butter stabilizer. A blend of mono-diglycerides and sodium stearoyl lactylate, marketed by SCM Corporation under the trademark CW-6, which has a Capillary Melting Point of 130°–140° F., would also be functional. Also, a mixture of mono-diglycerides and ethoxylated mono-diglycerides having a melting point of about 125°–130° F. would be functional.

Also useful is a soft mono-diglyceride such as Dur-em 204 (trademark SCM Corporation), which has a Capillary Melting Point of about 114°–121° F.

The ester portion of the emulsifier combination preferably is employed in a small amount, less than about 2%, preferably less than about 1.25%, based on the weight of the entire composition.

THE FILL PORTION

The bulking ingredient of the present invention can be ordinary freeze dried fruit powder or dried cheese powder. Prior application Ser. No. 402,844, refiled as Ser. No. 597,557, now U.S. Pat. No. 4,567,047, assigned to assignee of the present application, contains a detailed description of dried cheese powder ingredients which may be employed. These may be employed alone or as blends, or in combination with cheese flavors (which are cheese powders with other ingredients). The cheese powders are simply dehydrated cheese, usually spray dried powders, and many have a relatively high butterfat and/or vegetable fat content of, for instance, about 20 to about 46%, although, broadly, the cheese powders can vary all the way from about 60% fat down to as little as 0–10% fat. Also within the scope of the present invention are enzyme modified cheese powders. The cheese powders are available in a number of different flavors, for instance, Swiss, Cheddar, aged or unaged, and, perhaps, colored or uncolored. Preferably, the cheese powders are marketed with a moisture content of less than about 10%, preferably less than about 5%. The following Table 1 is a list of representative Swiss and Cheddar cheese powders and flavors that may be employed in the practice of the present invention, either alone or in blends:

TABLE 1

CHEESE POWDERS

| Trademark | Flavor | Min. Fat Content | Moisture Content Max. | Ingredient Declaration |
|---|---|---|---|---|
| Beatreme 1326 | Aged Cheddar | 46% | 3.5% | Cheddar cheese solids/sodium phosphate |
| Beatreme 1412 | Mild Cheddar | 46% | 3.5% | Manufactured from uncolored non-aged Cheddar cheese. |
| Cheztone 100 | Cheddar | 32% | 4.0% | Cheddar cheese solids, cultured non-fat milk solids, whey solids, hydrogenated shortening, salt, sodium phosphate; |
| Cheztone 101 | Cheddar | 32% | 4.0% | same as Cheztone 100 but with coloring. |
| Beatone 101 | Cheddar (high flavor powder) | 46% | 3.5% | Cheddar cheese solids |
| Beatreme 1923 | Typical Swiss | 39% | 3.5% | Swiss cheese solids/sodium phosphate |
| Beatone 700 | Swiss flavor | 20% | 4.0% | Enzyme modified swiss cheese solids, non-fat milk solids, sodium citrate. |
| Cheztone 700 | Swiss | 20% | 4.0% | Swiss cheese solids, cultured non-fat milk solids, sodium phosphate. |

The cheese powders and flavors of Table 1 are marketed by Beatrice Foods Co. In addition to the cheese powders of Table 1, the following can be used:

TABLE 2

| Borden Co. #3653 | Cheddar cheese, hydrogenated vegetable oil, buttermilk solids, salt, sodium phosphate, sodium hexametaphosphate, citric acid, lactic acid, and artificial color. |
|---|---|
| Nutritek 250 (Foremost Foods) Borden Zest 13653 | Whole milk cheese whey with 25% of the mineral salts removed. |
| Borden Co. #90 | Cheddar cheese, hydrogenated vegetable oil, condensed buttermilk, sodium chloride, disodium phosphate, sodium |

TABLE 2-continued

| | |
|---|---|
| | hexametaphosphate, citric acid, lactic acid, artificial color. |
| Borden Co. #87 | Swiss cheese flavoring powder alternative to Cheztone 700. |
| Land-O-Lakes Dried Process Cheese #5540 | Spray dried process cheese produced by removing moisture from processed American cheese by spray drying; fat content 46.5%, moisture 4%. |
| Land-O-Lakes #9809 | Spray dried Blue cheese produced by removing the moisture from aged Blue cheese; fat content 41%, moisture 4%. |
| Land-O-Lakes Cheddease 250 | Cheddar cheese in powder form - contains also buttermilk, whey, butter, salt, sodium phosphate, flavoring, MSG, coloring; fat content 25%, moisture 4%. |

The disclosure of Ser. No. 402,844 is incorporated by reference herein.

In addition to the above ingredients, one can employ a bland, friable, non-hygroscopic bulking ingredient such as described in prior application Ser. No. 577,393, filed Feb. 6, 1984, now U.S. Pat. No. 4,562,079, also assigned to assignee of the present application. As disclosed in Ser. No. 577,393, the bulking ingredient should be comprised of inert particles capable of being non-gritty in the lipid phase, either rendered so by conventional confectionery refining techniques or by separate particle size reduction of the bulking ingredient and adding the ground particulates to the lipid phase. For this purpose, a principal requirement of the bulking ingredient is that it be friable, having a friability factor approximately equivalent to that of sugar. Attrition of the bulking particles can be carried out in a number of ways, for instance, in a hammer mill, a ball mill, air mill, or a roll mill. It also may be desirable, for optimum control of properties of the finished product, that the bulking particles be substantially free of fat which would function as a diluent of the lipid phase. The bulking particles, as mentioned, preferably are bland in taste, to avoid masking or adversely affecting the other flavors which may be added. The particles are preferably non-hygroscopic, equivalent in this regard, as well, to sugar, to avoid water pick-up prior to processing. Water can adversely affect processing during refining, and/or conching, causing undesired agglomeration, as is well known in confectionery practice. Those particles which are bland in taste and at the same time have a high degree of friability and non-hygroscopicity approximating that of sugar, are disaccharides, such as lactose or whey. Whey is very high in lactose content. The whey can be demineralized whey or sweet dairy whey. Sweet dairy whey has a slight saltiness, which may be advantageous or disadvantageous, depending upon the dominant flavor desired.

The bulking particles of this invention can also include friable, dairy-derived food additives such as non-fat dry milk and non-fat buttermilk solids, both well known ingredients in confectionery formulations. Another useful ingredient is a protein, one that is bland in flavor, such as defatted soy protein. A friable protein such as a caseinate can also be used. The protein provides nutrition and also a desired astringency. A textured vegetable protein can be used. Another category of ingredients that can be used is a bland, hydrolyzed, non-hygroscopic, friable starch, such as a low DE corn syrup solid, preferably having a dextrose equivalent less than about 15, e.g., maltodextrin.

Many other bulking ingredients will be apparent to those skilled in the art, and many will be developed in the future since this is an area of rapidly developing technology. The present invention is not limited to specific ingredients. It is necessary only that they be bland or complementary in flavor with the dominant flavor desired, that they be friable and non-hygroscopic. By being friable, they resist agglomeration and can be reduced in particle size so that they are substantially impalpable in the coating. For purposes of the present application, the term friable means that the bulking ingredients are capable of a size reduction to not substantially greater than 50 microns average particle size.

The disclosure of Ser. No. 577,393 is incorporated by reference herein.

The bulking component of the present invention can also comprise flavor compatible combinations of the above ingredients. In addition, one may employ an amount of an invert sugar such as lactose, or even sucrose or dextrose, depending upon the amount of sweetness desired. Similarly, with the cheese powders, one may wish to employ an amount of a bland bulking ingredient such as non-fat dry milk solids or an invert sugar, preferably bland, such as lactose.

In the case of other savory flavors such as meat, fowl, fish or vegetable, flavorable bulking ingredients such as chesse and cocoa powder may not be desirable or compatible, and in such case the bulking ingredient might be solely a blend of such ingredients as called for in copending application Ser. No. 577,393. In that application, it was described that a combination of bulking ingredients was desirable. Specifically, a preferred bulking agent comprised at least 15% of a bland, dairy-derived, friable carbohydrate such as lactose, whey, or a blend thereof. On a parts basis, the bulking agent preferably comprised about 15-40 parts carbohydrate (either lactose, whey, or a blend thereof); approximately 0-30 parts maltodextrin or other bland, low DE hydrolyzed starch; and approximately 0-30 parts of a defatted soy protein or other friable, bland, non-hygroscopic protein having a high protein content. As was pointed out in the specification for Ser. No. 577,393, the dairy-derived ingredients such as non-fat dry milk solids and non-fat buttermilk solids may have too much flavor for many delicate flavors, such as a meat, fish or vegetable flavor. However, it is within the scope of the present invention that these materials can be included in small amounts. The protein component is advantageous in that it provides nutrition and also a desired astringency advantageous with such flavors as meat, fish or fowl. Carbohydrates such as lactose or whey have a slight milky flavor, and soy protein a slight beany flavor, so that a desirable ingredient of the base, to dilute the flavors of these ingredients, is a bland, hydrolyzed, non-hygroscopic, friable starch such as a low DE corn syrup solid having a dextrose equivalent less than about 15, e.g., maltodextrin.

In addition to the above, which can be referred to as the composition functional ingredients, the composition of the present invention can comprise flavor and color ingredients, and also certain specialized emulsifiers, for instance, aerating emulsifiers, should aeration be desired. These can be considered non-functional ingredients or additives in that they do not contribute to the performance or characteristics of the composition towards meeting the criteria established above. Proportions set forth herein do not take into consideration amounts of the so-called non-functional ingredients.

METHOD OF MANUFACTURE

The composition of the present invention requires both refining and intensive mixing or conching. Refining can be carried out by mixing all of the ingredients together and subjecting them to roll refining, for instance, in a 3-roll mill, following conventional confectionary practice, or the dry solids can be first mixed together and milled prior to adding them to the lipid portion of the composition. Pulverization of the dry solids should be to an average particle size less than about 50 microns.

Following refining, by either method, the composition should be mixed to a homogeneous state, by conventional conching or by other mixing effective to achieve a homogeneity (generically within the meaning of conching under present day practice). Mixing for two hours, by way of example, in a commercial mixer, at a temperature at which all the lipid ingredients are in a molten state, e.g., 150° F., should be sufficient.

Following mixing, the composition is screened to remove agglomerated particulate matter not properly wetted, with recycle of the same back to the mixer, and then the remainder is passed through a heat exchanger and extruded into a package, the cooling in the heat exchanger being to about the intended temperature of storage, e.g., 70° F. In this way, crystal size, percentage of crystals, and viscosity of the product are controlled. As indicated above, packaging can be a plastic deformable container suitable for hand squeezing, or a container suitable for spoon dipping.

EXAMPLE 1

The following formulation was employed:

| Ingredient | Percentage by Weight |
| --- | --- |
| Cheese blend, Code 1218 | 50 |
| Konut (TM) | 20 |
| Durkex 500 (TM) | 28.5 |
| Santone 3-1-S (TM) | 1.0 |
| Lecithin | 0.5 |

This was a 60/40 blend of hydrogenated non-lauric oil and lauric fat. Two batches were prepared. Batch 1 was aerated to a specific gravity of 0.715. Batch 2 was non-aerated and had a specific gravity of about 0.91.

Processing of both batches was by three-pass refining in a roller mill, followed by conching. Refining was at 100/125 psi in the first pass and 50/75 psi in the second and third passes. Neither batch showed any oiling-off, even after storage. The consistency was particularly good in the non-aerated batch. The Cheese Blend of this Example comprised a proprietary blend of parmesan cheese powder, maltodextrin, lactose, sour cream solids, buttermilk solids, non-fat dry milk, bleu cheese powder, natural flavor, dehydrated onion/garlic, lactic acid, color, and white pepper.

It is contemplated that the composition of the present invention will find application as a condiment with such items as french fries, nachos, tacos, salads, cooked vegetables (rice, broccoli, etc), baked potatoes, meats, sandwiches, puff pastries, muffins and the like.

Flavors can be tomato, barbecue, mustard and sour cream, by way of example. Cheese flavors can be swiss, blue, cheddar and nacho.

EXAMPLE 2

The following formulation was employed:

| Ingredient | Percentage by Weight |
| --- | --- |
| Cheese Blend Beatreme 1218 (TM) | 64.85 |
| Konut (TM) | 14.00 |
| Durkex 500 (TM) | 20.00 |
| Santone 3-1-S (TM) | .75 |
| Lecithin | .4 |

This also was approximately a 60:40 blend. The composition was prepared using the same procedure of Example 1. It also showed good shelf stability at room temperature.

We claim:

1. A shelf-stable, anhydrous, squeezeable, lipid-based, filled, savory or cheese-flavored composition having stand-up at room temperature suitable for hand dispensing at a temperature as low as 50° F. from a hand deformable plastic container through an orifice as small as two millimeters in diameter, consisting essentially of, based on the composition weight,
   (a) about 25% to about 70% lipid; and
   (b) about 75% to about 30% edible bulking ingredient;
   said lipid consisting essentially of a vegetable oil carrier, lecithin and lipophilic ester emulsifier having a Capillary Melting Point above about 110° F. and an HLB less than about 8, with the lecithin being about 0.3–0.6% of the lipid weight and the lipophilic ester emulsifier being about 0.5% to about 2% of the lipid weight;
   said vegetable oil carrier being selected from the group consisting of
   (1) a vegetable oil blend consisting essentially of (a) about 30% to about 70% of a hydrogenated non-lauric vegetable oil having a Wiley Melting Point of about 50° F. to about 85° F., an AOM stability of at least about 75 hours, and an SFI Index at 50° F. of less than about 20;
   (b) about 70% to about 30% of a lauric fat having a Wiley Melting Point less than about 96° F.; said blend having an SFI Index at 50° F. of less than about 5;
   (2) the vegetable oil of 1 (a) which is winterized at a temperature less than about 60° F. further comprising an emulsifier effective to remove cloud at 50° F.
   (3) an olein fraction of a fractionated coconut oil;
   said composition having a Brookfield viscosity of about 10 to about 60 at 120° F.

2. The composition of claim 1 wherein said vegetable oil blend is (a) a fractionated hydrogenated non-lauric fat having an an SFI at 70° F. of less than 10, a Wiley Melting Point of about 68°–78° F.; and an AOM stability of about 350 hours minimum; and (2) a lauric fat having a Wiley Melting Point of about 73°–79° F.

3. The composition of claims 1 or 2 prepared by the steps of
   (a) refining said bulking ingredient to a particle size less than about 50 microns;

(b) mixing said bulking ingredient and lipid together at a temperature above the melting point of the lipid ingredients to produce a homogeneous mixture;
(c) cooling said mixture in a heat exchanger to an exit temperature in the range of about 65°–75° F.; and
(d) packaging said mixture at said temperature.

4. The composition of claims 1 or 2 wherein said bulking ingredient is selected from the group consisting of a dried cheese powder; non-fat dry milk; non-fat buttermilk solids; lactose; whey; a friable, bland, vegetable or casein protein; a bland, hydrolyzed starch having a D.E. less than about 20; a disaccharide; and blends thereof.

5. The composition of claims 1 or 2 wherein said lipophilic emulsifier is selected from the group consisting of a polyglycerol ester of a fatty acid; a mono-diglyceride; a lactylated mono-diglyceride; and an ethoxylated or succinylated mono-diglyceride, and is present in an amount of about 0.5%–1.25%.

6. The composition of claim 4 having a fish, meat, fruit, fowl, cheese or vegetable flavor.

* * * * *